US006492287B1

(12) United States Patent
Srinivasan

(10) Patent No.: US 6,492,287 B1
(45) Date of Patent: Dec. 10, 2002

(54) UV STABILIZED SPUNBOND FABRICS WITH ENHANCED TRAPEZOIDAL TEAR

(75) Inventor: Ramesh Srinivasan, Simpsonville, SC (US)

(73) Assignee: BBA Nonwovens Simpsonville, Inc., Simpsonville, SC (US)

( * ) Notice: Subject to any disclaimer, the term of this patent is extended or adjusted under 35 U.S.C. 154(b) by 0 days.

(21) Appl. No.: 09/411,509

(22) Filed: Oct. 4, 1999

Related U.S. Application Data

(60) Provisional application No. 60/103,113, filed on Oct. 5, 1998.

(51) Int. Cl.[7] ............................ D04H 3/16; D04H 3/00; B32B 5/26
(52) U.S. Cl. .................... 442/401; 442/382; 442/414
(58) Field of Search ................. 442/381, 382, 442/401, 414

(56) References Cited

U.S. PATENT DOCUMENTS

| | | | |
|---|---|---|---|
| 4,070,218 A | 1/1978 | Weber | 156/167 |
| 4,340,563 A | 7/1982 | Appel et al. | 264/518 |
| 4,374,888 A | 2/1983 | Bornslaeger | 428/198 |
| 4,707,398 A | 11/1987 | Boggs | 428/224 |
| 5,004,770 A | 4/1991 | Cortolano et al. | 524/99 |
| 5,096,950 A | 3/1992 | Galbo et al. | 524/99 |
| 5,124,378 A | 6/1992 | Behrens et al. | 524/95 |
| 5,200,443 A | 4/1993 | Hudson | 524/99 |
| 5,300,647 A | 4/1994 | Malherbe et al. | 546/188 |
| 5,393,812 A | 2/1995 | Haley et al. | 524/91 |
| 5,482,765 A | 1/1996 | Bradley et al. | 428/286 |
| 5,484,645 A | 1/1996 | Lickfield et al. | 428/198 |
| 5,596,033 A | * 1/1997 | Horsey et al. | 524/100 |
| 5,834,541 A | * 11/1998 | Becker et al. | 524/119 |
| 5,939,341 A | 8/1999 | Brown et al. | 442/351 |
| 5,985,999 A | 11/1999 | Dominguez et al. | 525/74 |

FOREIGN PATENT DOCUMENTS

EP     EP 0792 911 A2    9/1997

OTHER PUBLICATIONS

Product Specification Data Sheets for: Limestone UV Grey–SB#3, SB#4, SB#5, MB#1, MB#2, Skyblue UV–SB#1, SB#2, MB#1, MB#2 colorant compounds; Standridge Color Corp., Social Circle, GA, Oct. 21, 1998–Dec. 03, 1998.
Antioxidants, Structure and Performance; Joseph A. Stretanski, Cytec.
Pigmented Fiber Stabilization; Rangarajan Srinivasan, et al., Ciba Specialty Chemicals, Tarrytown, NY, presented in St. Louis, MO Sep. 30–Oct. 1, 1996.
Fiberstab System: A New Standard in Polypropylene Fiber Stabilization; Ciba Additives.
Gas Fading—On Paper and in Practice, Sari–Beth Samuels, et al.; Cytec Industries, Stamford, CT.
Processing and Long–Term Thermal Stabilization of Polyolefins; Ciba–Geigy, Basel, Switzerland, Sep. 1992.
Brochure Re: Polyolefin Light Stabilizers; Ciba–Geigy Corp., U.S., 1992.

(List continued on next page.)

Primary Examiner—Terrel Morris
Assistant Examiner—Jenna Leigh Befumo
(74) Attorney, Agent, or Firm—Ostrager Chong & Flaherty LLP; Milagros A. Cepeda

(57) ABSTRACT

A nonwoven fabric with UV stability having a spunbonded fabric layer comprising a base resin selected from the group consisting of polypropylene and polyethylene; combined with melt processable additives; wherein said melt processable additives are a mixture of (i) at least two hindered amine light stabilizers; (ii) a processing aid selected from the group consisting of hydroxyl amines and phosphites; and (iii) a carrier resin selected from the group consisting of polypropylene and polyethylene. Other melt processable additives include pigments which are added to provide the desired color in the resulting fabric layer.

32 Claims, 1 Drawing Sheet

OTHER PUBLICATIONS

Performance Plus for Polymers: New Tinuvin UV Stabilizer Systems; Ciba–Geigy Corp., U.S., 1994.

Light Stabilizers—Theory and Practice, Joseph A. Stretanski, Cytec.

Pigments and their Influence on PP–Fibre Production and Quality; Claus Ripke, Clariant, May 1996.

Stabilization of Polypropylene Fibers—A New Era has Begun; J.R. Pauquet, et al., Ciba–Geigy, Basel, Switzerland.

Light Stabilizers for Polyolefins; Ciba Specialty Chemicals, Tarrytown, NY, 1998.

* cited by examiner

UV STABILIZED SPUNBOND FABRICS WITH ENHANCED TRAPEZOIDAL TEAR

RELATED APPLICATION

This application claims the benefit of U.S. Provisional Application No. 60/103,113, filed on Oct. 5, 1998, which is incorporated in its entirety herein by reference.

FIELD OF THE INVENTION

The invention relates to spunbonded nonwoven fabrics possessing light stability, particularly ultraviolet, suitable for substrates used to manufacture outdoor covers. In particular, the invention relates to nonwoven fabrics made using a combination of at least two hindered amine light stabilizers, hydroxyl amine and phosphite processing aids; and a carrier resin of polypropylene, polyethylene or a mixture of both. The resulting spunbonded fabric layer has enhanced trapezoidal tear in both the MD and CD directions.

BACKGROUND OF THE INVENTION

Nonwoven fabrics possessing light stability (particularly ultraviolet) are desirable for use as substrates to manufacture outdoor covers. Outdoor covers include marine, automobile, bike and recreational vehicle covers. Such covers include protecting the vehicle from wear and tear caused by wind, rain and sunlight. Nonwovens and nonwoven composites for such covers are available in the market. However, it was not possible hitherto to incorporate UV stability and still obtain high fabric strength, particularly trapezoidal tear strengths needed for downstream ultrasonic converting. To overcome these problems the invention provides a nowoven product and process for producing such a fabric, having enhanced trapezoidal tear, suitable for further ultrasonic lamination.

In general hindered amine light stabilizers (HALS) are known in the art. For example, published European patent application EP 0792911 A2 to Tennesen discloses a phosphate based flame retardant combined with alkoxyamine functional hindered amine light stabilizer (NOR-HALS) used to achieve flame retardant properties that are better than those with phosphates alone.

U.S. Pat. No. 5,393,812 to Haley describes fibers and fabrics, as used clothing, upholstery and carpeting which contain about 0.01 to 3% (preferably 0.2 to 1.0%) by weight of the composition, of a light stabilizer. This patent discloses a polyolefin, a NOR HALS (alkoxy amine functional hindered amine light stabilizers) and a phosphorous flame retardant (col. 2 line 33–40; col. 4 line 62–64). Regular HALS (hindered amine light stabilizers) may be employed additionally or in place of NOR HALS.

U.S. Pat. No. 5,096,950 to Galbo discloses numerous N-OR1 alkoxy hindered amine light stabilizers.

U.S. Pat. No. 5,200,443 to Hudson discloses a nonwoven web of polypropylene polymer containing an acetylated hindered amine light stabilizer and a hindered amine substituted siloxane.

U.S. Pat. No. 5,004,770 to Cortolano; U.S. Pat. No. 5,124,378 to Behrens; U.S. Pat. No. 5,939,341 to Brown and U.S. Pat. No. 5,300,647 to Malherber all disclose formulations of particular hindered amine light stabilizers.

None of the known prior art discloses a spunbonded nonwoven fabric with UV stability having enhanced durablity. Further, the known art has not disclosed the synergistic effect of combining at least two hindered amine light stabilizers to produce a spunbonded nonwoven fabric having enhanced trapezoidal tear properties.

Thus it is a broad object of the invention to provide a spunbonded nonwoven fabric with UV light stability. Specifically, the fabric layer is made of a base (or virgin) resin polypropylene which is combined with melt processing additives. These additives are a mixture of (i) at least two hindered amine light stabilizers (HALS); (ii) processing aids which are either hydroxyl amines or phosphites or a combination of both; and (iii) a carrier resin of either polypropylene or polyethylene or a mixture of both. Pigments are also included in the formulations to impart desired color properties to the resulting fabrics. The additives are incorporated into a base polyolefinic resin to form a homogeneous blend which is then spunbonded to form the fabric layer.

Another object of the invention is to provide a spunbonded fabric structure possessing at least two layers of spunbond (SB) webs to which suitable melt processable additives have been incorporated to the virgin resin before melt spinning.

A specific object of the invention is to provide spunbond cover substrates having spunbond-spunbond (SS), spunbond-spunbond-spunbond (SSS) and spunbond-spunbond-spunbond-spunbond (SS-SS) composite structures all having enhanced trapezoidal tear strength.

Another more specific object of the invention is to provide spunbond structures having a useful service life from six to sixty months, depending on the desired end use.

Another specific object of the invention is to provide a spunbond fabric that possesses superior initial physical properties as measured by grab/strip tensile tests and trapezoidal tear tests.

A further object of the invention is to provide a spunbond fabric that does not suffer a loss of more than 50% of its initial MD, CD tensiles and initial MD, CD trapezoidal tear values at the end of its useful service life.

A further specific object of the invention is to provide a spunbond fabric wherein the color shift is maintained within tolerances over the entire service life.

SUMMARY OF THE INVENTION

The present invention provides a spunbond fabric possessing UV light stability for use as a substrate to manufacture outdoor covers.

The spunbonded fabric comprises a base resin selected from the group consisting of polypropylene and polyethylene combined with melt processable additives. The melt processable additives are a mixture of (i) at least two hindered amine light stabilizers; (ii) a processing aid selected from the group consisting of hydroxyl amines and phosphites; and (iii) a carrier resin selected from the group consisting of polypropylene and polyethylene. Pigments are also included in the formulations to impart desired color properties to the resulting fabrics.

The base resin and melt processable additives are combined to form a homogeneous blend which is then spunbonded to form a nonwoven fabric layer.

The nonwoven fabric of the invention may comprise multiple fabric layers. Fabric structures encompassed by the invention include spunbond (SB), spunbond-spunbond (SS), spunbond-spunbond-spunbond (SSS), spunbond-spunbond-spunbond-spunbond (SS-SS) nonwoven fabrics.

Other objects, features and advantages of the present invention will be apparent when the detailed description of the preferred embodiments of the invention are considered with reference to the drawings, which should be construed in an illustrative and not limiting sense as follows:

DETAILED DESCRIPTION OF THE PREFERRED EMBODIMENTS

Figure 1:
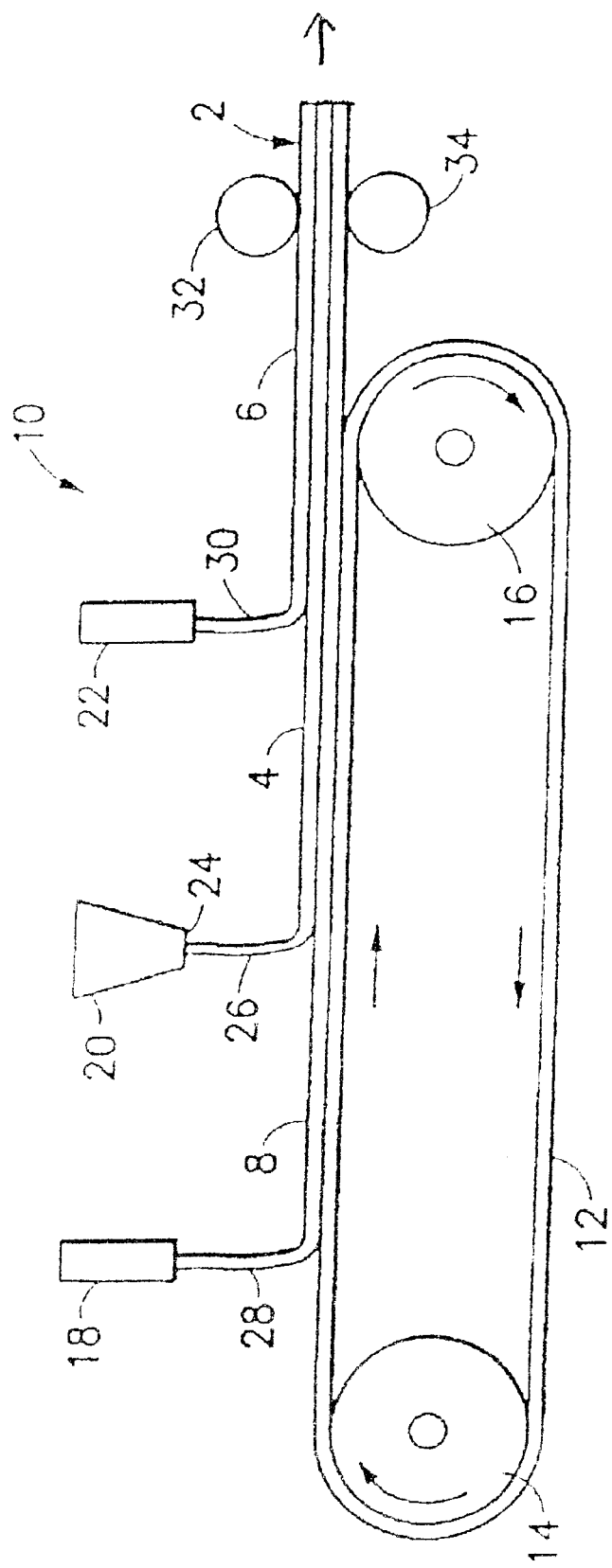
FIG. 1 is a schematic diagram showing the basic components of a system for producing the nonwoven fabric in accordance with the process of the invention.

As used herein, the term "nonwoven web" or "nonwoven fabric" are interchangable and refer to a web/fabric that has a structure of individual fibers or filaments which are interlaid, but not in an identifiable repeating pattern.

As used herein, the term "spunbonded fibers" refers to fibers which are formed by extruding molten thermo-plastic material as filaments from a plurality of fine, usually circular capillaries of a spinnerette. Cooling air is fed to a quenching chamber wherein the filaments are cooled. The cooling air is then sucked through a nozzle, which accelerates the flow of air. The friction between the flowing air and the filaments creates a force which draws the filaments, i.e., attenuates the filaments to a smaller diameter. The drawn filaments are then passed through a diffusor and deposited on a conveyor belt to form a nonwoven web. A conventional spinbonding technique is disclosed in U.S. Pat. No. 4,340,563 to Appel.

In general, the invention provides a nonwoven fabric with UV stability having a spunbonded fabric layer comprising a base resin selected from the group consisting of polypropylene and polyethylene combined with melt processable additives. The melt processable additives are a mixture of (i) at least two hindered amine light stabilizers; (ii) a processing aid selected from the group consisting of hydroxyl amines and phosphites; and (iii) a carrier resin selected from the group consisting of polypropylene and polyethylene. Pigments are also included in the formulations to impart desired color properties to the resulting fabrics.

The base resin is an olefinic material preferably either polyproylene or polyethylene. In preparing the spunbonded webs of the invention, the base resin is typically present in amounts ranging from 80 to 99 wt %. The base resin used must be compatible with the carrier resins in the formulations in order for homogeneous combination of the base resin with the melt processable additives. Thus, if the base resin is polypropylene the carrier resin is preferably polypropylene or a combination of polypropylene and polyethylene. A preferred base resin used in the invention is a polypropylene having a melt flow rate of 35 commercially available as Montel PH805 from Montel Polyolefins, Moltel USA, Wilmington, Del.

Preferred hindered amine light stabilizers used in the invention are 1,3,5-Triazine-2,4,6-triamine, N,N'''[1,2-ethanediylbis[[4,6-bis-[buty(1,2,2,6,6-pentamethyl-4-piperidinyll)amino]-1,3,4-triazin-2-yl]imino]-3,1 propanediyl]]bis[N',N''-dibutyl-N',N''-bis(1,2,2,6,6-pentamethyl-4-piperidinyl) commercially available as Chimassorb™119 from Ciba Specialty Chemicals Canada, Mississauga, Ontario, Canada; dimethyl succinate polymer with 4-hydroxy-2,2,6,6-tetramethyl-1-piperidineethanol commercially available as Tinuvin™622 from Ciba Specialty Chemicals Canada, Mississauga, Ontario, Canada; Poly[[6-[(1,1,3,3,-tetramethyl butyl)amino]1,3,5-triazine-2, 4-diyl][2,2,6,6-tetramethyl-4-piperidyl) imino] hexamethylene[2,2,6,6-tetramethyl-4-piperidyl) imino]] commerically available as Chimassorb™ 944 from Ciba Specialty Chemicals Canada, Mississauga, Ontario, Canada; and 1,6-Hexanediamine, N,N'-bis(2,2,6,6-tetramethyl-4-piperidinyl)-polymer with 2,4,6,-trichloro-1,3,5-triazine, reaction products with N-butyl-1-butanamine and N-butyl-2,2,6,6-tetramethyl-4-piperidinamine commercially available as Chimassorb™2020 from Ciba Specialty Chemicals Canada, Mississauga, Ontario, Canada. The data sheets for Chimassorb™119, 944 and 2020 and Tinuvin™622 are all incorporated herein by reference.

At least two hindered amine light stabilizers (HALS) are combined in the invention formulations and are preferably combined in a ratio of 9:1 to 1:9. The total hindered amine light stablizers are present in the resulting fabric layer in amounts ranging from 1000 ppm to 25,000 ppm. The combination of using two HALS provides for increased loading of the UV stabilizer materials in the final spunbond product. In addition, the synergistic effect of the two HALS result in a product with an increased durability and product life.

The preferred processing aids used in the invention are hydroxyl amine (bis (hydrogenated tallow alkyl) amines, oxidized and Tris(2,4-di-tert-butylphenyl)phosphite These materials are either used in the formulations separately or in combination. The processing aids are present in the fabric layer in amounts ranging from 100 ppm to 10,000 ppm.

Preferred carrier resins are polyethylenes with a melt index from 1 to 20 and polypropylenes with a melt flow rate between 2 and 60. The carrier resin may also be a mixture of polypropylene and polyethylene, which is combined in a ratio of 9.5:1 to 1:9.5.

As discussed in more detail herein the fabric layer may further include color pigments added at levels up to 10 wt % to the color concentrate formulations prior to spunbonding.

The melt processable additives are combined together prior to mixing with the base (virgin) resin. The melt processable additive formulations preferably have a melt flow rate of less than 35 to aid in producing a homogenous blend. Typically, between 1 to 20 wt % of the melt processable additive formulations are blended with between 80 to 99 wt % of the base resin. This blend is then formed into a spunbond web.

The invention also provides a method of making a nonwoven fabric with UV stability having a spunbonded fabric layer by combining a base resin selected from the group consisting of polypropylene and polyethylene with melt processable additives to form a homogeneous blend. The melt processable additives are a mixture of (i) at least two hindered amine light stabilizers; (ii) a processing aid selected from the group consisting of hydroxyl amines and phosphites; and (iii) a carrier resin selected from the group consisting of polypropylene and polyethylene. The homogeneous blend is spunbonded to form the nonwoven fabric layer.

The nonwoven fabric of the invention can be a single fabric layer but preferably comprises multiple spunbond fabric layers. Fabric structures encompassed by the invention include spunbond (SB), spunbond-spunbond (SS), spunbond-spunbond-spunbond (SSS), spunbond-spunbond-spunbond (SS-SS).

In an embodiment of the invention, a nonwoven fabric having at least two of the fabric layers is formed by spinbonding the homogeneous blend to form a first and second nonwoven fabric layers followed by thermally bonding the layers together.

In another embodiment of the invention, a nonwoven fabric having at least three of the fabric layers is formed by spinbonding the homogeneous blend to form a first, second and third nonwoven fabric layer followed by thermally bonding the layers together.

In another embodiment of the invention, a nonwoven fabric having at least four of the fabric layers is formed by spinbonding the homogeneous blend to form a first, second, third and fourth nonwoven fabric layer followed by thermally bonding the layers together.

FIG. 1 is a schematic diagram showing the basic components of a system for producing the nonwoven fabric in accordance with the process of the invention.

As previously described the nonwoven fabric of the invention has at least one fabric layer made from a homogeneous blend of a base resin and a combination of melt processable additives. The blend is spunbonded to form the fabric layer.

The spunbonded fabric layer may be produced by continuously extruding the homogeneous blend through a plurality of fine, usually circular capillaries of a spinnerette. Pressurized cooling air is fed to a quenching chamber wherein the filaments are cooled. The cooling air is then accelerated through a nozzle by a positive air pressure. The friction between the flowing air and the filaments creates a force which draws the filaments, i.e., attenuates the filaments to a smaller diameter. The filaments are drawn to achieve molecular orientation and tenacity. The continuous filaments are then deposited in a substantially random manner to form a web of substantially continuous and randomly arranged, molecularly oriented filaments. The preferred base polyolefinic resin used to make spunbonded fabric layers is polypropylene, although nylon, polyethylene, polyester, and copolymers and blends thereof can be used.

The nonwoven fabric of the invention has a least one layer. Multiple fabric layers are encompassed by the invention, with numerous variations of spunbonded fabric layers possible. Multiple fabric layers are then bonded together in one-step by the application of heat and pressure to form the desired fabric composite. Spunbonded fabric layers may be prebonded by heated press rolls providing structural integrity to the fabric.

For illustrative purposes, the production of a spunbond-spunbond-spunbond (SSS) fabric structure of the invention is described. The production line illustrated in FIG. 1 can be operated at a speed in the range of 250 to 600 m/min, preferably about 375 m/min. The equipment of production line 10 consists of an endless foraminous forming belt 12 wrapped around rollers 14 and 16. The belt 12 is driven in the direction shown by the arrows. The production line 10 includes a forming machine which has three stations: spunbond station 18, spunbond station 20 and spunbond station 22. In other embodiments, depending on the desired fabric structure, not all these stations may be operating.

For the SSS structure, first, the spunbond station 18 lays down a web 8 of spunbonded fibers 28 onto the carrier belt 12. Then the spunbond station 20 lays down a web 4 of spunbonded fibers 26 onto the spunbond web 8. Lastly, the spunbond station 22 lays down a web 6 of spunbonded fibers 30 onto the spunbond web 4.

The spunbond stations 18, 20 and 22 are conventional extruders with spinnerettes which form continuous filaments of a polymer/melt additive and deposit those filaments onto the forming belt 12 in a random interlaced fashion. Each spunbond station may include one or more spinnerette heads depending on the speed of the process and the particular polymer being used. Forming spunbonded material is a conventional process well known in the art.

Out of the forming machine, the SSS fabric laminate web 2 is then fed through bonding rolls 32 and 34. The surfaces of the bonding rolls 32 and 34 are provided with a pattern of raised lands which apply heat and pressure to thermally spot bond the three layers together. The bonding rolls are heated to a temperature which causes the spunbonded polymer to soften. As the spunbond webs pass between the heated bonding rolls 32 and 34, the composite material is compressed and heated by the bonding rolls in accordance with the pattern on the rolls to create a pattern of discrete bonding areas. Such discrete area or spot bonding is well known in the art and can be carried out by means of heated rolls or by ultrasonic bonding. The bond pattern is selected to provide desired fabric strength characteristics. The pattern bonding area is not limited in accordance with the present invention, although pattern bonding areas in the range of 5–25%, preferably 14–19%, of the total fabric area are feasible. In the alternative, the laminate can be ultrasonically spot bonded or bonded by hot melt/glue adhesive lamination.

As a further illustration of the process of the invention and in accordance with another embodiment, a spunbonded/spunbonded (SS) fabric laminate is formed by operating only spunbond stations 18 and 22, i.e., spunbond station 20 is turned off. In this case, the bonding rolls 32 and 34 must be heated to a temperature which causes the spunbonded polymer to soften.

Other fabric structures encompassed by the invention are formed as described by the process above and as illustrated in FIG. 1 with the number of spunbond stations, 18, 20 or 22 depending on the number of layers in the desired end fabric.

In contrast to prior art systems where each spunbond web is formed separately and thermally bonded twice, first to form the layer and second to form the composite, the present invention provides a one-step thermal bonding process. Specifically, the spunbond webs are laid, i.e. one, two, three, etc, and then thermally bonded together in one-step.

The following examples are for purposes of illustration only and this invention should not be considered to be limited by any recitation used therein.

EXAMPLE 1

An outdoor cover spunbond substrate possessing UV stability with enhanced trapezoidal trap tear properties was produced.

A UV color concentrate was prepared mixing the following ingredients:

(1) 15 wt % of a mixture of hindered amine light stabilizers consisting of a 9:1 ratio of 1,3,5-Triazine-2,4,6-triamine,N,N'''-[1,2-ethanediylbis[[4,6-bis [buty(1,2,2,6,6-pentamethyl-4-piperidinyl)amino]-1,3,4-triazin-2-yl]imino]-3,1 propanediyl]]bis[N',N''-dibutyl-N',N''-bis(1,2,2,6,6-pentamethyl-4 piperidinyl) (commerically available as Chimassorb™119) and dimethyl succinate polymer with 4-hydroxy-2,2,6,6-tetramethyl-1-piperidineethanol (commerically available as Tinuvin®622). Both Chimassorb™119 and Tinuvin™622 are available from Ciba Specialty Chemicals Canada, Mississauga, Ontario, Canada.

(2) 5 wt % of a processing aid consisting of a 1:1 ratio of hydroxyl amine (bis(hydrogenated tallow alkyl) amines oxidized and Tris (2,4-di-tert-butylphenyl) phosphite (commerically available as Fiberstab™ FS 301 system by Ciba Specialty Chemicals Canada, Mississauga, Ontario, Canada).

(3) The remaining amount of the concentrate consists of a polypropylene carrier resin which, in this example, includes a brilliant UV blue pigment commerically available from Standridge Color Corporation, Social Circle, Georgia. The polypropylene carrier resin used has a melt flow rate of 4 and is available commercially from Montel Canad, Varennes, Quebec, Canada. The amount of pigment in the UV color concentrate formulations was up to 40 wt. %, preferably up to 10 wt %.

5 wt % of the UV color concentrate was then combined with 95 wt % of base polypropylene resin to form a homogeneous blend. The base polypropylene used was Montel PH805, available from Montel Polyolefins, Montel USA Inc., Wilmington, Del., and has a 35 melt flow rate. This blend was spunbonded to form a nonwoven fabric layer.

Samples were then made of a nonwoven fabric having at least two of the spunbonded fabric layers (SS structure). The homogeneous blend was spunbonded to form first and second nonwoven fabric layers which were then thermally bonded together. The SS sample laminates were made at 28.4 gsy and 56.7 gsy. Physical properties and measurements of these samples were taken and summarized, respectively, in TABLES 1 and 2 below.

TABLE 1

28.4 gsy BRILLIANT UV BLUE SPUNBOND (SS)

| NO | BASIS WT. gsy | CD GRAB TENSILE gm/in | CD GRAB ELONG % | MD GRAB TENSILE gm/in | MD GRAB ELONG % | CALIPER mils | MD TRAP TEAR, gms | CD TRAP TEAR, gms |
|----|------|---------|--------|---------|--------|-------|---------|---------|
| 1 | 29.30 | 6157.00 | 148.60 | 9026.00 | 108.00 | 12.80 | 6082.00 | 3551.00 |
| 2 | 29.22 | 6190.00 | 127.30 | 9659.00 | 105.90 | 13.95 | 5902.00 | 3811.00 |
| 3 | 28.51 | 6074.00 | 138.10 | 8701.00 | 114.40 | 12.75 | 5312.00 | 3665.00 |
| 4 | 29.09 | 6287.00 | 144.30 | 9656.00 | 97.20  | 12.97 | 5872.00 | 3484.00 |

TABLE 2

56.7 gsy BRILLIANT UV BLUE SPUNBOND (SS)

| NO | BASIS WT. gsy | CD GRAB TENSILE gm/in | CD GRAB ELONG % | MD GRAB TENSILE gm/in | MD GRAB ELONG % | CALIPER mils | MD TRAP TEAR, gms | CD TRAP TEAR, gms |
|----|------|---------|--------|---------|--------|-------|----------|---------|
| 5  | 56.82 | 14750.0 | 153.10 | 19940.0 | 122.50 | 18.59 | 12070.00 | 8843.00 |
| 6  | 57.19 | 13690.0 | 134.20 | 18810.0 | 109.90 | 18.77 | 11600.00 | 7999.00 |
| 7  | 57.60 | 14300.0 | 136.50 | 19530.0 | 112.30 | 18.99 | 11970.00 | 8176.00 |
| 8  | 57.64 | 13700.0 | 136.20 | 19720.0 | 126.60 | 18.06 | 11390.00 | 8315.00 |
| 9  | 57.56 | 14400.0 | 139.70 | 18650.0 | 115.40 | 19.20 | 13770.00 | 8054.00 |
| 10 | 57.81 | 13440.0 | 135.40 | 19180.0 | 118.60 | 18.67 | 12130.00 | 7912.00 |
| 11 | 57.07 | 13850.0 | 142.90 | 19790.0 | 106.80 | 18.81 | 10960.00 | 7789.00 |
| 12 | 57.88 | 14970.0 | 147.00 | 19150.0 | 113.50 | 19.38 | 10900.00 | 7727.00 |

Several variations of the nonwoven fabric made in this example in accordance with the invention process are possible. Although the fabric structure is described in this example as SS composite structure, other additional composites are possible. Examples include SS, SSS, SSSS, or other combinations. Such composites are made in a one-step process wherein all the layers are eventually thermally bonded together.

An advantage of this invention over prior practice in this area is in the provision of spunbonded nonwoven fabrics having enhanced trapezoidal tear.

EXAMPLE 2

Samples 13 to 28, summarized in TABLE 3 below, illustrate various melt processable additive formulations that are used to produce spunbonded fabric layers in accordance with the process of the invention.

The wt %'s listed in TABLE 3 refer to the additive formulations. These formulations are combined in amounts ranging between 1 to 20 wt % with a base resin of either polypropylene or polyethylene in amounts ranging between 80 to 99 wt % to form a blend that is then spunbonded into a fabric layer.

The total amount of hindered amine light stabilizers (HALS) present in the resulting spunbond fabric layer from each Sample is also indicated in TABLE 3.

In general, in Samples 13 to 28 the melt processable additives contain:

(1) a mixture of two hindered amine light stabilizers (HALS) consisting of HAL-1 which is 1,3,5-Triazine-2,4,6-triamine,N,N'''-[1,2-ethanediylbis[[4,6-bis-[buty(1,2,2,6,6-pentamethyl-4-piperidinyll)amino]-1,3,4-triazin-2-yl]imino]-3,1 propanediyl]]bis[N',N''-dibutyl-N',N''-bis(1,2,2,6,6-pentamethyl-4piperidinyl) (commerically available as Chimassorb®119); combined with HAL-2 which is dimethyl succinate polymer with 4-hydroxy-2,2,6,6-tetramethyl-1-piperidineethanol (commerically available as Tinuvin®622). Both Chimassorb®119 and Tinuvin® are available from Ciba Specialty Chemicals Canada, Mississauga, Ontario, Canada.

(2) a processing aid ("Process Aid") consisting of a 1:1 ratio of hydroxyl amine (bis(hydrogenated tallow alkyl) amines oxidized and Tris(2,4-di-tert-butylphenyl) phosphite (commericially available as Fiberstab FS 301 system by Ciba Specialty Chemicals Canada, Mississauga, Ontario, Canada).

(3) The remaining melt processable additives consist of either a polypropylene or polyethylene carrier resin in combination with a pigment. The polypropylene carrier resin ("PP") used in the formulations have a melt flow rate between 2 and 35. The polyethylene carrier ("PE") used in the sample formulations have a melt index between 1 and 20.

TABLE 3

MELT PROCESSABLE ADDITIVE FORMULATIONS

| SAMPLE NO. | CARRIER RESIN | HAL-1 % | HAL-2 % | PROCESS AID % | PIGMENTS & CARRIER RESIN % | FINAL UV TOTAL HALS ON FABRIC, ppm |
|---|---|---|---|---|---|---|
| 13 | PP | 1.5 | 0.17 | 1 | 97.33 | 300–1,000 |
| 14 | PE | 1.5 | 0.17 | 1 | 97.33 | 300–1,000 |
| 15 | PP | 4.5 | 0.5 | 1.67 | 93.33 | 1,000–2,500 |
| 16 | PE | 4.5 | 0.5 | 1.67 | 93.33 | 1,000–2,500 |
| 17 | PP | 0.9 | 0.1 | 2.5 | 87.5 | 2,000–5,000 |
| 18 | PE | 0.9 | 0.1 | 2.5 | 87.5 | 2,000–5,000 |
| 19 | PP | 14.4 | 1.6 | 2.5 | 81.5 | 3,200–8,000 |
| 20 | PE | 14.4 | 1.6 | 2.5 | 81.5 | 3,200–8,000 |
| 21 | PP | 16.2 | 1.8 | 4 | 78 | 3,600–9,000 |
| 22 | PE | 16.2 | 1.8 | 4 | 78 | 3,600–9,000 |
| 23 | PP | 22.5 | 2.5 | 3 | 72 | 5,000–12,500 |
| 24 | PE | 22.5 | 2.5 | 3 | 72 | 5,000–1,2500 |
| 25 | PP | 29.7 | 3.3 | 4 | 63 | 6,600–16,500 |
| 26 | PE | 29.7 | 3.3 | 4 | 63 | 6,600–16,500 |
| 27 | PP | 37.5 | 4.17 | 5 | 53.33 | 16,500–21,000 |
| 28 | PE | 37.5 | 4.17 | 5 | 53.33 | 16,500–21,000 |

In TABLE 3, Examples 27 and 28 have the highest amounts of UV HALS in the spunbonded product, 16,500 to 21,000 ppm, and provide a fabric having a longer service life and greater durablity.

Examples 3 to 11 below illustrate nonwoven fabrics with UV stability having a spunbonded fabric layer made in accordance with the invention. In general the fabric layers of these examples include 80 to 99.0 wt % of a base polypropylene resin; up to 10 wt % of an ultraviolet color concentrate and up to 10 wt % of an ultraviolet augmentor formulation. Both the ultraviolet color concentrate and augmentor formulations have melt flow rates less than 35.

The ultraviolet color concentrates have the following general formula:
- 15.0 to 50.0 wt % of a mixture of hindered amine light stabilizers;
- up to 10.0 wt % of a processing aid;
- up to 10.0 wt % pigments; and
- the remainder of the formulation comprising a polypropylene carrier resin.

The hindered amine light stabilizers in the color concentrate of Examples 3–10 are a mixture of Chimassorb™ 119 and Tinuvin™622, and Example 11 is a mixture of Chimassorb™ 119 and 2020. Tinuvin™622, Chimassorb™ 119 and 2020 are all commericially available from Ciba Specialty Canada, Mississauga, Ontario, Canada.

The processing aid in the color concentrate of Examples 3–11 is the Fiberstab™FS 301 system commericially available by Ciba Specialty Chemicals Canada, Mississauga, Ontario, Canada, which is a 1:1 combination of hydroxyl amine (bis(hydrogenated tallow alkyl) amines oxidized and Tris(2,4-di-tert-butylphenyl) phosphite. The later component Tris(2,4-di-tert-butylphenyl) phosphite is also available separately under the tradename Irgafos™168 from Ciba Specialty Chemicals Canada. The data sheet for FS 301 system and Irgafos™168 is incorporated herein by reference.

The processing aid performs the critical function of reducing the sudden increases in the viscosity of the homopolymer PP, usually caused by the introduction of hindered amines into the polypropylene. Although such function can be performed by traditional phenolic antioxidants, they are known to cause yellowing of the polypropylene fabric, unlike the processing aids used in the invention formulations,.

As mentioned, formulations incorporating the FS 301 processing system are added up to 10 wt %, preferably between 2–5 wt %. In the final spunbond fabric layer the processing aid is present in amounts ranging from 100 to 10,000 ppm, preferably between 1000 to 3000 ppm.

The pigments in the formulations are used to impart color. As illustrated in Examples 3–11 various pigments are incorporated into the formulations depending on the desired color of the resulting spunbond fabric. The pigments used include: Natural Brown UV, Dark Gull Grey UV, Neutral UV Grey, Limestone UV Grey, Charcoal UV Grey #1, Charcoal Grey #2, Brilliant UV Blue PP, Brilliant UV Blue, Limestone UV Grey#2, Desert Dust UV #1-PP, Desert Dust UV #2-PP, Desert Dust UV #1-PE and Desert Dust UV #2-PE all available commericially from Standridge Color Corporation, Social Circle, Ga. The respective data sheets for each of the pigments are incorporated herein by reference. The pigments used include inorganic pigments, organic pigments, metal oxides, combinations of these pigments as well as other materials. The pigments are typically added at levels of up to 40 wt %, preferably up to 10 wt %, in the UV color concentrate formulations.

The selection of the carrier resin is very important in achieving the desired melt flow characteristics of the concentrate. Both polypropylene and polyethylene carrier resins were found to be suitable for incorporating the loadings of the UV stabilizer and the processing aid systems. However, since the UV stabilizers typically have molecular weights significantly lower than that of the homopolymer polypropylene, only polypropylene and polyethylene carriers with the right viscosity could be used to produce the fabrics of the invention.

Preferred polypropylene carrier resins found to result in the highest melt stability in the formulations include Montel Profax™ 6301 and Montel Profax™ 6501, both in powder form, commericially available from Montell Canada, Varennes, Quebec, Canada. Profax™ 6301 has a melt flow rate of 11 and Profax™ 6501 has a melt flow rate of 4. The data sheets for Montel Profax™ 6301 and Montel Profax™ 6501 are incorporated herein by reference.

Preferred polyethylene carrier resins used in the formulations include polyethylene resins having a melt index less than 20, available commericially from Mobil Polymers, Edison, N.J.

The ultraviolet augmentor formulations have the following general formula:
- 15.0 to 50.0 wt % of a hindered amine light stabilizer;
- 1.0 to 5.0 wt % of a phosphite processing aid; and
- the remainder a carrier resin that is a mixture of polyethylene and polypropylene.

The hindered amine light stabilizer used in the augmentor formulations of Examples 3 to 11 was Poly[[6[(1,1,3,3,-tetramethylbutyl)amino]-1,3,5-triazine-2,4-diyl][2,2,6,6-tetramethyl-4-piperidyl)imino]hexamethylene[2,2,6,6-tetramethyl-4-piperidyl)imino]] which is commerically available as Chimassorb 944 from Ciba Specialty Chemicals Canada, Mississauga, Ontario, Canada. The data sheet for Chimassorb™ 944 is incorporated herein by reference.

The processing aid used in augmentor formulations of the Examples was Tris(2,4-di-tert-butylphenyl) phosphite (commercially available as Irgafos™168). The carrier resin was a combination of between 2 to 20 wt % of a low density polyethylene having a melt index of 2 and a polypropylene having a melt flow rate of 4 (commerically available as Montell Profax™ 6501).

Examples 3 to 11 below are merely illustrative of some of the spunbonded fabrics encompassed by the invention and are not meant to be limiting.

EXAMPLE 3

A spunbond fabric (28.4 gsy) was formed by combining the UV Color concentrate formulations, UV augmentor formulations and virgin polypropylene resin as described above. The pigment used in this example was Desert Dust UV.

Two layers of this fabric were thermally bonded together to form a spunbond-spunbond structure. Physical properties and measurements of this fabric was taken and summarized in TABLE 4. The total amount of hindered amine light stabilizers present in each fabric layer is 7500 ppm.

TABLE 4

SPUNBOND-SPUNBOND FABRIC PROPERTIES

| FABRIC PROPERTIES | UNITS | VALUE |
| --- | --- | --- |
| BASIS WEIGHT | gsy | 28.94 |
| MD GRAB TENSILE | lbs | 19.08 |
| CD GRAB TENSILE | lbs | 14.07 |
| MD TRAP TEAR | lbs | 8.38 |
| CD TRAP TEAR | lbs | 12.45 |
| MD ELONGATION | % | 96.00 |
| CD ELONGATION | % | 115.00 |
| CALIPER | mils | 12.83 |

EXAMPLE 4

A spunbond fabric (28.4 gsy) was formed by combining the UV Color concentrate formulations, UV augmentor formulations and virgin polypropylene resin as described above. The pigment used in this example was Limestone UV Grey.

Two layers of this fabric were thermally bonded together to form a spunbond-spunbond structure. Physical properties and measurements of this fabric was taken and summarized in TABLE 5. The total amount of hindered amine light stabilizers present in each fabric layer is 7500 ppm.

TABLE 5

SPUNBOND-SPUNBOND FABRIC PROPERTIES

| FABRIC PROPERTIES | UNITS | VALUE |
| --- | --- | --- |
| BASIS WEIGHT | gsy | 28.85 |
| MD GRAB TENSILE | lbs | 19.71 |
| CD GRAB TENSILE | lbs | 15.82 |
| MD TRAP TEAR | lbs | 8.57 |
| CD TRAP TEAR | lbs | 11.07 |
| MD ELONGATION | % | 120 |
| CD ELONGATION | % | 138 |
| CALIPER | mils | 13.06 |

EXAMPLE 5

A spunbond fabric (56.7 gsy) was formed by combining the UV Color concentrate formulations, UV augmentor formulations and virgin polypropylene resin as described above. The pigment used in this example was Limestone UV Grey.

Two layers of this fabric were thermally bonded together to form a spunbond-spunbond structure. Physical properties and measurements of this fabric was taken and summarized in TABLE 6. The total amount of hindered amine light stabilizers present in each fabric layer is 7500 ppm.

TABLE 6

SPUNBOND-SPUNBOND FABRIC PROPERTIES

| FABRIC PROPERTIES | UNITS | VALUE |
| --- | --- | --- |
| BASIS WEIGHT | gsy | 56.52 |
| MD GRAB TENSILE | lbs | 44.26 |
| CD GRAB TENSILE | lbs | 37.21 |
| MD TRAP TEAR | lbs | 18.77 |
| CD TRAP TEAR | lbs | 23.62 |
| MD ELONGATION | % | 118 |
| CD ELONGATION | % | 146 |
| CALIPER | mils | 18.93 |

EXAMPLE 6

A spunbond fabric (28.4 gsy) was formed by combining the UV Color concentrate formulations, UV augmentor formulations and virgin polypropylene resin as described above. The pigment used in this example was Natural Brown UV.

Two layers of this fabric were thermally bonded together to form a spunbond-spunbond structure. Physical properties and measurements of this fabric was taken and summarized in TABLE 7. The total amount of hindered amine light stabilizers present in each fabric layer is 7500 ppm.

TABLE 7

SPUNBOND-SPUNBOND FABRIC PROPERTIES

| FABRIC PROPERTIES | UNITS | VALUE |
| --- | --- | --- |
| BASIS WEIGHT | gsy | 28.9 |
| MD GRAB TENSILE | lbs | 19.90 |
| CD GRAB TENSILE | lbs | 15.32 |
| MD TRAP TEAR | lbs | 8.62 |
| CD TRAP TEAR | lbs | 12.26 |
| MD ELONGATION | % | 101 |
| CD ELONGATION | % | 129 |
| CALIPER | mils | 12.72 |

EXAMPLE 7

A spunbond fabric (28.4 gsy) was formed by combining the UV Color concentrate formulations, UV augmentor formulations and virgin polypropylene resin as described above. The pigment used in this example was Desert Dust UV.

Two layers of this fabric were thermally bonded together to form a spunbond-spunbond structure. Physical properties and measurements of this fabric was taken and summarized in TABLE 8. The total amount of hindered amine light stabilizers present in each fabric layer is 13,500 ppm.

TABLE 8

SPUNBOND-SPUNBOND FABRIC PROPERTIES

| FABRIC PROPERTIES | UNITS | VALUE |
| --- | --- | --- |
| BASIS WEIGHT | gsy | 28.13 |
| MD GRAB TENSILE | lbs | 19.87 |
| CD GRAB TENSILE | lbs | 14.76 |
| MD TRAP TEAR | lbs | 8.48 |
| CD TRAP TEAR | lbs | 12.17 |

TABLE 8-continued

SPUNBOND-SPUNBOND FABRIC PROPERTIES

| FABRIC PROPERTIES | UNITS | VALUE |
|---|---|---|
| MD ELONGATION | % | 92 |
| CD ELONGATION | % | 119 |
| CALIPER | mils | 11.88 |

EXAMPLE 8

A spunbond fabric (28.4 gsy) was formed by combining the UV Color concentrate formulations, UV augmentor formulations and virgin polypropylene resin as described above. The pigment used in this example was Natural Brown UV.

Two layers of this fabric were thermally bonded together to form a spunbond-spunbond structure. Physical properties and measurements of this fabric was taken and summarized in TABLE 9. The total amount of hindered amine light stabilizers present in each fabric layer is 13,500 ppm.

TABLE 9

SPUNBOND-SPUNBOND FABRIC PROPERTIES

| FABRIC PROPERTIES | UNITS | VALUE |
|---|---|---|
| BASIS WEIGHT | gsy | 28.79 |
| MD GRAB TENSILE | lbs | 20.38 |
| CD GRAB TENSILE | lbs | 14.51 |
| MD TRAP TEAR | lbs | 8.47 |
| CD TRAP TEAR | lbs | 13.73 |
| MD ELONGATION | % | 92 |
| CD ELONGATION | % | 137 |
| CALIPER | mils | 12.74 |

EXAMPLE 9

A spunbond fabric (28.4 gsy) was formed by combining the UV Color concentrate formulations, UV augmentor formulations and virgin polypropylene resin as described above. The pigment used in this example was Limestone UV Grey.

Two layers of this fabric were thermally bonded together to form a spunbond-spunbond structure. Physical properties and measurements of this fabric was taken and summarized in TABLE 10. The total amount of hindered amine light stabilizers present in each fabric layer is 13,500 ppm.

TABLE 10

SPUNBOND-SPUNBOND FABRIC PROPERTIES

| FABRIC PROPERTIES | UNITS | VALUE |
|---|---|---|
| BASIS WEIGHT | gsy | 28.45 |
| MD GRAB TENSILE | lbs | 19.05 |
| CD GRAB TENSILE | lbs | 15.43 |
| MD TRAP TEAR | lbs | 7.99 |
| CD TRAP TEAR | lbs | 11.93 |
| MD ELONGATION | % | 94 |
| CD ELONGATION | % | 132 |
| CALIPER | mils | 12.08 |

EXAMPLE 10

A spunbond fabric (56.7 gsy) was formed by combining the UV Color concentrate formulations, UV augmentor formulations and virgin polypropylene resin as described above. The pigment used in this example was Limestone UV Grey.

Two layers of this fabric were thermally bonded together to form a spunbond-spunbond structure. Physical properties and measurements of this fabric was taken and summarized in TABLE 11. The total amount of hindered amine light stabilizers present in each fabric layer is 13,500 ppm.

TABLE 11

SPUNBOND-SPUNBOND FABRIC PROPERTIES

| FABRIC PROPERTIES | UNITS | VALUE |
|---|---|---|
| BASIS WEIGHT | gsy | 57.28 |
| MD GRAB TENSILE | lbs | 43.30 |
| CD GRAB TENSILE | lbs | 32.90 |
| MD TRAP TEAR | lbs | 18.00 |
| CD TRAP TEAR | lbs | 26.80 |
| MD ELONGATION | % | 100 |
| CD ELONGATION | % | 141 |
| CALIPER | mils | 18.63 |

EXAMPLE 11

A spunbond fabric (101.7 gsy) was formed by combining the UV Color concentrate formulations, UV augmentor formulations and virgin polypropylene resin as described above. The pigment used in this example was Dark Gull Gray UV.

Three layers of this fabric were thermally bonded together to form a spunbond-spunbond-spunbond structure. Physical properties and measurements of this fabric was taken and summarized in TABLE 12. The total amount of hindered amine light stabilizers present in each fabric layer is 14,000 ppm.

TABLE 12

SPUNBOND-SPUNBOND-SPUNBOND FABRIC PROPERTIES

| FABRIC PROPERTIES | UNITS | VALUE |
|---|---|---|
| BASIS WEIGHT | gsy | 101.7 |
| MD GRAB TENSILE | lbs | 50 |
| CD GRAB TENSILE | lbs | 52 |
| MD TRAP TEAR | lbs | 21 |
| CD TRAP TEAR | lbs | 25 |
| MD ELONGATION | % | 59 |
| CD ELONGATION | % | 58 |
| CALIPER | mils | 20.5 |

Polymer properties that influence the ultimate fiber properties in the spunbonded fabric are molecular weight, molecular weight distribution (MWD) and degree of crystallinity. Generally, the higher the molecular weight and degree of crystallinity, the stronger the final fibers. The MWD determines how the fibers behave in the melt drawndown stages of fiber formation. This distribution has significant effects on the resultant fibers strengths and processability. In view of these polymer properties and due to melt flow rates, chemical reactions and processability factors of the melt processable additives used herein, a spunbonded fabric having UV stability has hitherto not been possible before.

An advantage of this invention over prior practice in this area is in the provision of spunbonded nonwoven fabrics that have UV light stability and maintaining high fabric strength, particularly enhanced trapezoidal tear strengths. The preferred embodiments of the invention have been disclosed for the purpose of illustration. Variations and modifications of the disclosed preferred embodiments which fall within the concept of this invention have been described and will also be readily apparent to persons skilled in the art. All such variations and modifications are intended to be encompassed by the claims set forth hereinafter.

What is claimed is:

1. A nonwoven fabric with UV stability having a spunbonded fabric layer consisting of:
    a base resin selected from the group consisting of polypropylene and polyethylene;
    combined with melt processable additives;
    wherein said melt processable additives are a mixture of
        (i) at least two hindered amine light stabilizers, selected from the group consisting of: 1,3,5-Triazine-2,4,6-triamine,N,N'''-[1,2-ethanediylbis[[4,6-bis-[buty(1,2,2,6,6-pentamethyl-4-piperidinyl) amino]-1,3,4-triazin-2-yl]imino]-3,1 propanediyl]]bis[N',N''-dibutyl-N', N''-bis(1,2,2,6,6-pentamethyl-4 piperidinyl); Dimethyl succinate polymer with 4-hydroxy-2,2,6,6-tetramethyl-1-piperidineethanol; Poly[[6-[(1,1,3,3,-tetramethyl butyl)amino]-1,3,5-triazine-2,4-diyl][2,2,6,6-tetramethyl-4-piperidyl) imino] hexamethylene[2,2,6,6-tetramethyl-4-piperidyl)imino]]; and 1,6-Hexanediamine, N,N'-bis(2,2,6,6-tetramethyl-4-piperidinyl)-polymer with 2,4,6,-trichloro-1,3,5-triazine, reaction products with N-butyl-1-butanamine and N-butyl-2,2,6,6-tetramethyl-4-piperidinamine.;
        (ii) a processing aid selected from the group consisting of hydroxyl amines and a combination of hydroxyl amines and phosphites; and
        (iii) a carrier resin selected from the group consisting of polypropylene, polyethylene and a combination of polypropylene and polyethylene.

2. The nonwoven fabric as defined in claim 1 wherein said at least two of said hindered amine light stabilizers are combined in a ratio of 9:1 to 1:9.

3. The nonwoven fabric as defined in claim 1 wherein the total hindered amine light stabilizers present in the fabric layer are in amounts ranging from 1000 ppm to 25,000 ppm.

4. The nonwoven fabric as defined in claim 1 wherein said processing aids are hydroxyl amine (bis (hydrogenated tallow alkyl) amines, oxidized and Tris(2,4-di-tert-butylphenyl)phosphite.

5. The nonwoven fabric as defined in claim 1 wherein said processing aids are present in the fabric layer in amounts ranging from 100 ppm to 10,000 ppm.

6. The nonwoven fabric as defined in claim 1 wherein said carrier resin is polyethylene with a melt index from 1 to 20.

7. The nonwoven fabric as defined in claim 1 wherein said carrier resin is polypropylene with a melt flow rate between 2 and 60.

8. The nonwoven fabric as defined in claim 1 wherein said carrier resin is a mixture of polypropylene and polyethylene combined in a ratio of 9.5:1 to 1:9.5.

9. The nonwoven fabric as defined in claim 1 wherein said melt processable additives have a combined melt flow rate less than 35.

10. The nonwoven fabric as defined in claim 1 wherein the fabric layer further comprises color pigments added at levels up to 10 wt %.

11. The nonwoven fabric as defined in claim 1 having at least two of the spunbonded fabric layers thermally bonded together.

12. The nonwoven fabric as defined in claim 1 having at least three of the spunbonded fabric layers thermally bonded together.

13. The nonwoven fabric as defined in claim 1 having at least four of the spunbonded fabric layers.

14. A nonwoven fabric with UV stability having a spunbonded fabric layer comprising:
    (a) 80 to 99.0 wt % of a base resin selected from the group consisting of polypropylene, polyethylene, polyester and polyamide;
    (b) more than 0% and up to 10% of an ultraviolet color concentrate comprising:
        (i) at least a first and a second hindered amine light stabilizer, said first and said second hindered amine light stabilizers having different chemical compositions;
        (ii) a first processing aid selected from the group consisting of hydroxyl amines, phosphites and a combination of hydroxyl amines and phosphites;
        (iii) a first carrier resin selected from the group consisting of polypropylene, polyethylene and a combination of polypropylene and polyethylene; and
        (iv) pigments; and
    (c) more than 0% and up to 10% of an ultraviolet augmentor comprising:
        (i) a third hindered amine light stabilizer;
        (ii) a second processing aid selected from the group consisting of phosphites; and
        (iii) a second carrier resin comprising a low density polyethylene having a melt flow index of less than 20 and polypropylene.

15. The nonwoven fabric as defined in claim 14 wherein said hindered amine light stabilizers are selected from the group consisting of 1,3,5-Triazine-2,4,6-triamine,N,N'''-[1,2-ethanediylbis[[4,6-bis-[buty(1,2,2,6,6-pentamethyl-4-piperidinyl)amino]-1,3,4-triazin-2-yl] imino]-3,1 propanediyl]]bis [N',N''-dibutyl-N',N''-bis(1,2,2,6,6-pentamethyl-4 piperidinyl); dimethyl succinate polymer with 4-hydroxy-2,2,6,6-tetramethyl-1-piperidineethanol; Poly [[6-[(1,1,3,3,-tetramethyl butyl)aminol-1,3,5-triazine-2,4-diyl] [2,6,6-tetramethyl-4-piperidyl)imino]hexamethylene [2,2,6,-tetramethyl-4-piperidyl)imino]]; and 1,6-Hexanediamine, N,N'-bis(2,2,6,6,-tetramethyl-4-piperidinyl)-polymer with 2,4,6,-trichloro-1,3,5-triazine, reaction products with N-butyl-1-butanamine and N-butyl-2,2,6,6-tetramethyl-4-piperidinamine.

16. The nonwoven fabric as defined in claim 15 wherein said ultraviolet color concentrate contains at least two of said hindered amine light stabilizers which are combined in a ratio of 9:1 to 1:9.

17. The nonwoven fabric as defined in claim 14 wherein the total hindered amine light stabilizers are present in the fabric layer in amounts ranging from 1000 ppm to 25,000 ppm.

18. The nonwoven fabric as defined in claim 14 wherein said first processing aid is hydroxyl amine (bis (hydrogenated tallow alkyl) amines, oxidized and Tris(2,4-di-tert-butylphenyl)phosphite.

19. The nonwoven fabric as defined in claim 14 wherein said first processing aid is present in the fabric layer in amounts ranging from 100 ppm to 10,000 ppm.

20. The nonwoven fabric as defined in claim 14 wherein said first carrier resin is polypropylene with a melt flow rate between 2 and 60.

21. The nonwoven fabric as defined in claim 14 wherein said first carrier resin is a mixture of polypropylene and polyethylene combined in a ratio of 9.5:1 to 1:9.5.

22. The nonwoven fabric as defined in claim 14 wherein said ultraviolet color concentrate and said ultraviolet augmentor each have a melt flow rate less than 35.

23. The nonwoven fabric as defined in claim 14 wherein said pigments are added at levels up to 10 wt %.

24. The nonwoven fabric as defined in claim 14 having at least two of the spunbonded fabric layers thermally bonded together.

25. The nonwoven fabric as defined in claim 14 having at least three of the spunbonded fabric layers thermally bonded together.

26. The nonwoven fabric as defined in claim 14 having at least four of the spunbonded fabric layers.

27. The nonwoven fabric as defined in claim 14, wherein said second processing aid is oxidized and Tris(2,4-di-tert-butylphenyl)phosphite.

28. The nonwoven fabric as defined in claim 14, wherein said second processing aid is present in the fabric layer in amounts ranging from 100 ppm to 10,000 ppm.

29. The nonwoven fabric as defined in claim 14, wherein said first processing aid has the same chemical composition as said second processing aid.

30. The nonwoven fabric as defined in claim 14, wherein said third hindered amine light stabilizer has the same chemical composition as said first hindered amine light stabilizer.

31. The nonwoven fabric as defined in claim 14, wherein said first carrier resin has the same chemical composition as said second carrier resin.

32. The nonwoven fabric as defined in claim 14, wherein said second carrier resin is a mixture of polypropylene and polyethylene combined in a ratio of 9.5:1 to 1:9.5.

* * * * *